US012749992B2

(12) United States Patent
Sawano

(10) Patent No.: US 12,749,992 B2
(45) Date of Patent: Sep. 29, 2026

(54) MOTOR DRIVE DEVICE

(71) Applicant: KABUSHIKI KAISHA TOYOTA JIDOSHOKKI, Kariya (JP)

(72) Inventor: Shunsuke Sawano, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 114 days.

(21) Appl. No.: 18/602,192

(22) Filed: Mar. 12, 2024

(65) Prior Publication Data

US 2024/0333178 A1 Oct. 3, 2024

(30) Foreign Application Priority Data

Mar. 29, 2023 (JP) ................................ 2023-053003

(51) Int. Cl.

*H02P 1/48* (2006.01)
*H02P 23/00* (2016.01)
*H02P 23/14* (2006.01)
*H02P 27/08* (2006.01)

(52) U.S. Cl.

CPC ............ *H02P 1/48* (2013.01); *H02P 23/0004* (2013.01); *H02P 23/14* (2013.01); *H02P 27/08* (2013.01)

(58) Field of Classification Search

CPC ........ H02P 1/48; H02P 23/0004; H02P 23/14; H02P 27/08

See application file for complete search history.

(56) References Cited

U.S. PATENT DOCUMENTS

| | | | |
|---|---|---|---|
| 2003/0011340 A1 | 1/2003 | Odachi et al. | |
| 2016/0329849 A1* | 11/2016 | Nakajima ............ | B62D 5/0484 |
| 2021/0006183 A1* | 1/2021 | Shimizu .................. | H02P 21/34 |
| 2023/0208326 A1 | 6/2023 | Yoshino et al. | |
| 2024/0097589 A1 | 3/2024 | Tobari et al. | |

FOREIGN PATENT DOCUMENTS

| | | | |
|---|---|---|---|
| JP | 2002-369572 | A | 12/2002 |
| JP | 2008-206330 | A | 9/2008 |
| JP | 2019-50684 | A | 3/2019 |
| JP | 2022-175990 | A | 11/2022 |
| KR | 10-2021-0000152 | A | 1/2021 |
| KR | 10-2023-0004600 | A | 1/2023 |

OTHER PUBLICATIONS

Chenhui Zhou et al., "Sensorless Predictive Current Control of a Permanent Magnet Synchronous Motor Powered by a Three-Level Inverter", Applied Sciences; 2021, vol. 11, No. 10840, pp. 1-14 (14 pages total).

* cited by examiner

*Primary Examiner* — Zoheb S Imtiaz
(74) *Attorney, Agent, or Firm* — Sughrue Mion, PLLC

(57) ABSTRACT

A motor drive device includes a motor having a rotor, and a control device that controls the motor. The control device calculates a first value based on a d axis current and a q axis current of the motor. The control device calculates a second value by integrating the first value. The control device calculates a third value by performing prescribed control for making the second value equal to zero. The control device performs, based on the third value, position control for causing a rotational position of the rotor to match a designated position.

9 Claims, 12 Drawing Sheets

FIG.8

$$\frac{d}{dt}x(t)=\frac{x(t)-x(t-T)}{T}\cdots(A)$$

$$\frac{d}{dt}(x(t)+Err(t))=\frac{x(t)+xe(t)-(x(t-T)+xe(t-T))}{T+Te}\cdots(B)$$

$$=\frac{x(t)-x(t-T)}{\boxed{T+Te}}+\boxed{\frac{xe(t)-xe(t-T)}{T+Te}}\cdots(C)$$

D1 D2

MOTOR DRIVE DEVICE

CROSS REFERENCE TO RELATED APPLICATIONS

This nonprovisional application is based on Japanese Patent Application No. 2023-053003 filed on Mar. 29, 2023 with the Japan Patent Office, the entire contents of which are hereby incorporated by reference.

BACKGROUND

The present disclosure relates to a motor drive device.

DESCRIPTION OF THE BACKGROUND ART

There are conventionally known motor drive devices that control a motor having a rotor. A motor drive device disclosed in Japanese Patent Laying-Open No. 2002-369572, for example, estimates the position of a rotor in a sensorless manner. When starting to control a motor, this motor drive device performs an initial operation in which the position of the rotor is set to a prescribed initial position (designated position).

SUMMARY

When the initial operation is performed, there may be a large angular displacement between the position of the rotor and the designated position. In this case, it may take a significant amount of time for the position of the rotor to reach the designated position.

The present disclosure has been made to solve such a problem, and an object of the present disclosure is to reduce an amount of time for the position of a rotor to reach a designated position.

(1) A motor drive device of the present disclosure includes a motor, an inverter, and a control device. The motor includes a rotor, and a stator around which coils of three phases are wound. The inverter drives the motor. The control device controls the inverter. The control device performs coordinate transformation of a current flowing through the motor into a d axis current and a q axis current. The control device calculates a correlation value by integrating a value based on the d axis current and the q axis current, the correlation value correlated with an amount of difference between a position of the rotor and a designated position. The control device performs, based on the correlation value, position control for causing the position of the rotor to match the designated position.

According to such a configuration, the motor drive device performs the position control based on the correlation value correlated with the amount of difference between the position of the rotor and the designated position. Therefore, the motor drive device can reduce an amount of time for the position of the rotor to reach the designated position.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 8 illustrates robustness and the like.

DESCRIPTION OF THE PREFERRED EMBODIMENTS

Figure 1:
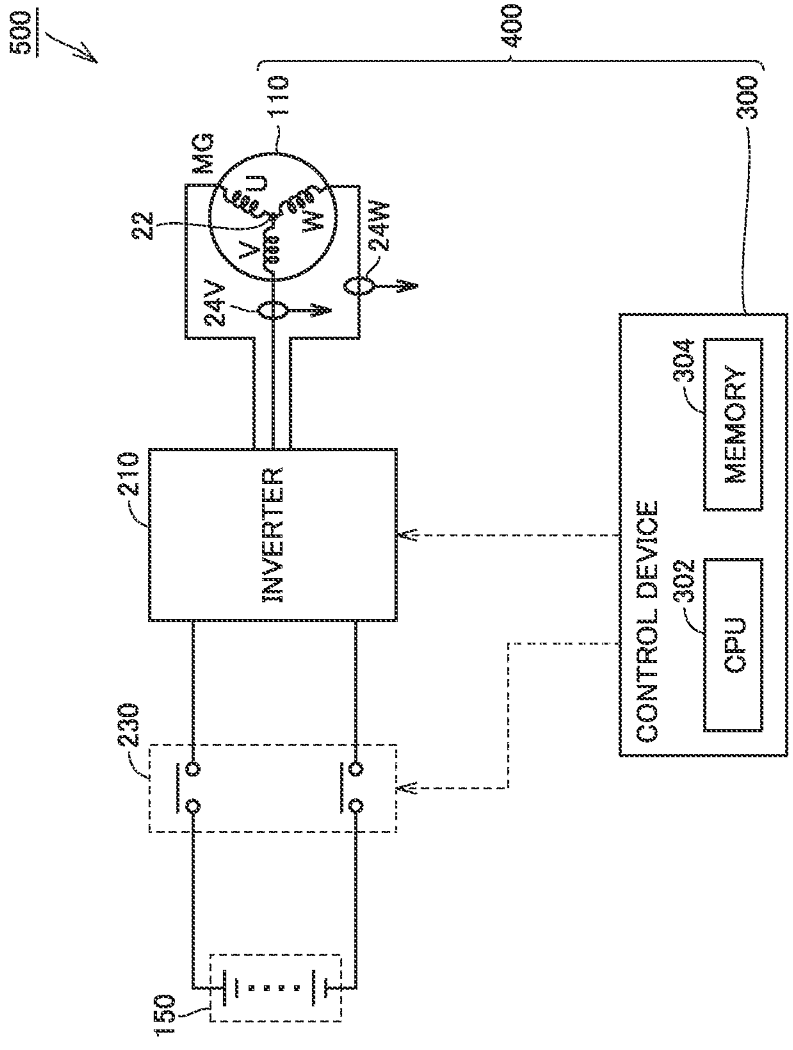
FIG. 1 is a functional block diagram of an electric system.

Embodiments of the present disclosure are hereinafter described in detail with reference to the drawings. The same or corresponding parts are denoted by the same reference characters in the drawings and description thereof will not be repeated.

FIG. 1 is a block diagram of an electric system 500. The electric system 500 is mounted on, for example, an electric vehicle. The electric system 500 includes a battery 150, an SMR (System Main Relay) 230, an inverter 210, a motor 110, and a control device 300. The control device 300 is also referred to as an arithmetic circuit.

The motor 110 is typically a three-phase AC rotating electric machine configured in the form of a permanent magnet motor. The motor 110 includes star-connected U-phase coil, V-phase coil and W-phase coil as a stator winding. Each phase coil has one end mutually connected at a neutral point 22. Each phase coil has the other end connected to a connection point (not shown) between switching elements of each phase arm of the inverter 210.

The battery 150 has a positive electrode and a negative electrode connected to the SMR 230. A voltage from the battery 150 is supplied to the inverter 210 through a converter (not shown).

The inverter 210 drives the motor 110. The inverter 210 is configured in the form of a three-phase inverter. When the electric vehicle is running, the inverter 210 controls current or voltage of each phase coil of the motor 110 so that the motor 110 operates in accordance with an operational command value (typically a torque value Tr described later) which is set for generating a drive force (vehicle drive torque, electric power generation torque, or the like) required for the running.

A current sensor 24V detects a V-phase current Iv flowing through the motor 110. A current sensor 24W detects a W-phase current Iw flowing through the motor 110. The V-phase current Iv and the W-phase current Iw are input to a coordinate transformation unit 320 (see FIG. 2) of the control device 300. Since the sum of instantaneous values of three-phase currents Iu, Iv and Iw is zero, it is sufficient to arrange the sensors so as to detect motor currents of two phases (e.g., the V-phase current Iv and the W-phase current Iw), as shown in FIG. 1. Thus, the U-phase current Iu is not illustrated in FIG. 2 described later.

The control device 300 controls the SMR 230, the inverter 210, and the like. The control device 300 includes a CPU (Central Processing Unit) 302 and a memory 304 as main components. The memory 304 has a ROM (Read Only Memory) and a RAM (Random Access Memory), for example. The ROM stores a program for execution by the CPU 302. The RAM temporarily stores data (e.g., a voltage feature amount described later) generated by execution of the program by the CPU 302. A motor drive device 400 includes the motor 110 and the control device 300. The motor drive device 400 of the present embodiment employs a sensorless configuration that does not include a sensor (resolver) to detect a rotational position of the motor 110.

[Functional Block Diagram of Control Device]

Figure 2:
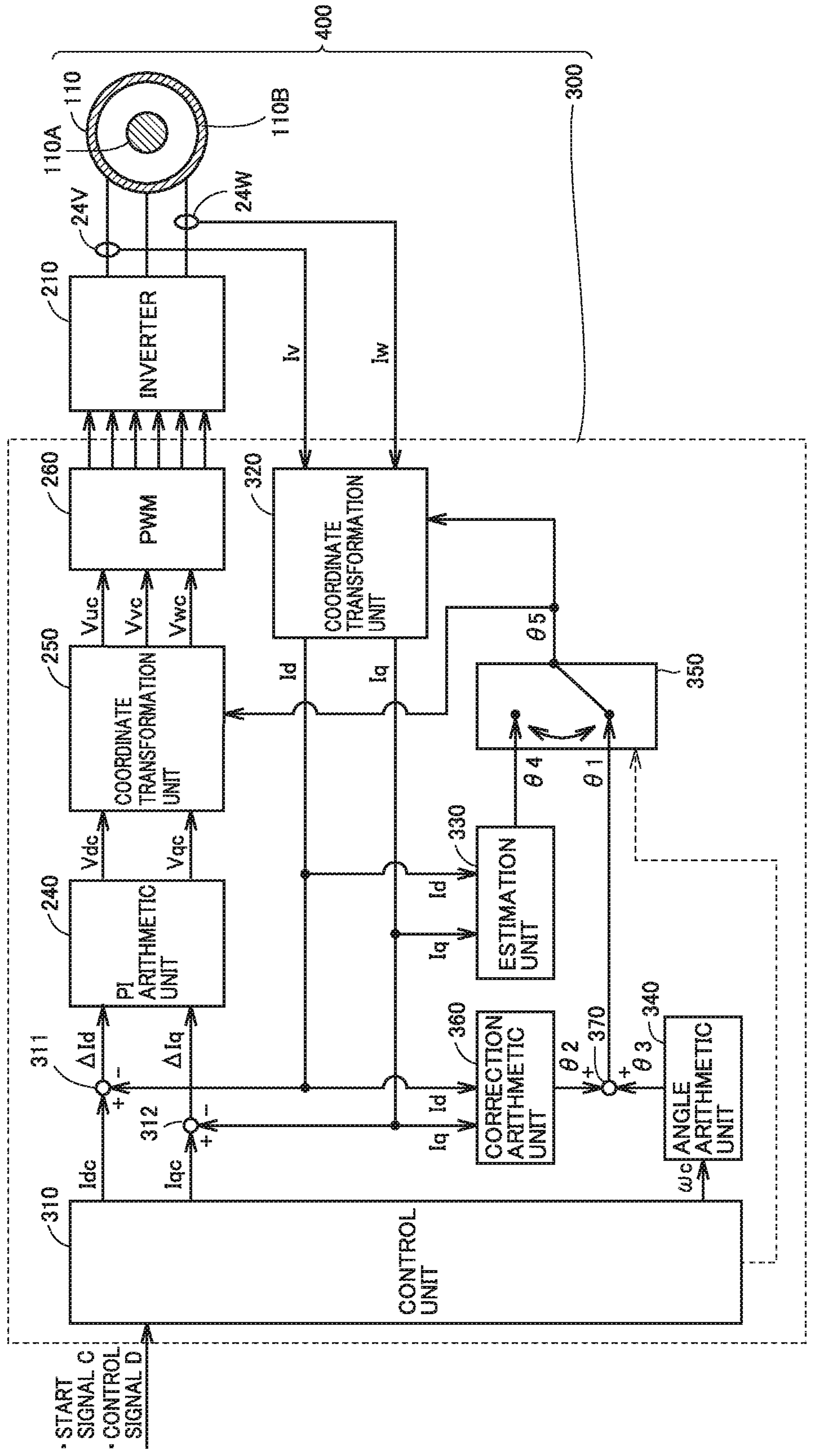
FIG. 2 is a functional block diagram of a control device.

FIG. 2 is a functional block diagram of the control device 300 and the like. In the example of FIG. 2, the control device 300 includes a PI arithmetic unit 240, a coordinate transformation unit 250, a PWM (Pulse Width Modulation) unit 260, a control unit 310, a coordinate transformation unit 320, an estimation unit 330, an angle arithmetic unit 340, a switch unit 350, and a correction arithmetic unit 360. The motor 110 includes a rotor 110A and a stator 110B. The rotor 110A corresponds to "rotor" of the present disclosure. The stator 110B is configured in the form of wound coils of three phases (the U-phase coil, the V-phase coil and the W-phase coil in FIG. 1).

The control device 300 can communicate with a higher-level controller (not shown). The higher-level controller transmits a start signal C to the control device 300 when starting the electric system 500. The higher-level controller transmits a control signal D when initial control ends. The higher-level controller may be provided separately from or integrated with the control device 300. The start signal C is a signal for causing the control device 300 to perform initial control. The control signal D is a signal for causing the control device 300 to perform normal control.

Upon receiving the start signal C, the control device 300 performs the initial control. The initial control is control for causing a rotational position of the motor 110 (rotor 110A) to match a designated position (see FIG. 3 and the like described later). The designated position is a position designated by the control device 300. The initial control corresponds to "position control" of the present disclosure.

Upon receiving the control signal D, the control device 300 performs the normal control. The normal control is, for example, control while the electric vehicle having the electric system 500 mounted thereon is being driven. From the time the initial control is started, an initial control flag is stored in a prescribed storage area (e.g., a portion of the memory 304 in FIG. 1). The initial control flag is a flag indicating that the initial control is being performed. The initial control flag is erased when the initial control ends. The control device 300 of the present embodiment performs the initial control for each prescribed period (a sampling period described later). The control device 300 also performs the normal control for the each prescribed period.

The switch unit 350 can be switched between a first state and a second state through control by the control unit 310. The first state is a state in which an angle θ1 output from an addition unit 370 is output as an angle θ5 to the coordinate transformation unit 250 and the coordinate transformation unit 320. The second state is a state in which an angle θ4 output from the estimation unit 330 is output as the angle θ5 to the coordinate transformation unit 250 and the coordinate transformation unit 320. The first state is shown in the example of FIG. 2.

The control unit 310 performs the initial control after setting the state of the switch unit 350 to the first state. The control unit 310 performs the normal control after setting the state of the switch unit 350 to the second state.

[Normal Control]

The normal control is now described. The control signal D includes a torque value Tr, for example, and the control device 300 performs the normal control for causing the motor 110 to produce a torque having the torque value Tr. The control unit 310 generates, in accordance with a table or the like created in advance, a d axis current command value Idc and a q axis current command value Iqc required for the motor 110 to produce a torque corresponding to the torque value Tr. A d axis current is a current that generates a magnetic field in a direction parallel to a direction of a magnetic field generated by the rotor 110A. A q axis current is a current orthogonal to the d axis current.

The coordinate transformation unit 320 transforms, by means of a coordinate transformation equation (from three phases to two phases) using the angle θ5 output from the switch unit 350, the V-phase current Iv and the W-phase current Iw into a d axis current Id and a q axis current Iq at command axial coordinates dc-qc. In other words, the coordinate transformation unit 320 performs coordinate transformation of a current flowing through the motor 110 into a d axis current and a q axis current. The coordinate transformation equation for the coordinate transformation unit 320 is an equation (1), for example. In the equation (1) and an equation (2) described later, "u" of the current Iu, "w" of the current Iw, and "5" of θ5 are shown as subscripts.

$$\begin{pmatrix} Id \\ Iq \end{pmatrix} = \sqrt{2}\begin{pmatrix} I_u\sin\left(\theta_5 + \frac{2}{3}\pi\right) - I_w\sin\theta_5 \\ I_u\sin\left(\theta_5 + \frac{2}{3}\pi\right) - I_w\cos\theta_5 \end{pmatrix} \tag{1}$$

The V-phase current Iv is detected by the current sensor 24V. The W-phase current Iw is detected by the current sensor 24W. The V-phase current Iv and the W-phase current Iw are current values on three-phase AC coordinates as stationary coordinates. The d axis current Id and the q axis current Iq are output to a subtraction unit 311 and a subtraction unit 312, respectively. The d axis current Id and the q axis current Iq are also output to the estimation unit 330 and the correction arithmetic unit 360.

The estimation unit 330 estimates, based on the d axis current Id and the q axis current Iq, the rotational angle θ4 of the motor by a prescribed arithmetic operation. The estimated angle θ4 is output to the switch unit 350.

The subtraction unit 311 calculates a deviation ΔId between the d axis current value and the d axis current command value (ΔId=Idc−Id), and outputs this ΔId to the PI arithmetic unit 240. The subtraction unit 312 calculates a deviation ΔIq between the q axis current value and the q axis current command value (ΔIq=Iqc−Iq), and outputs this ΔIq to the PI arithmetic unit 240.

The PI arithmetic unit 240 performs a PI (proportional integral) arithmetic operation of the d axis current deviation ΔId and the q axis current deviation ΔIq with a prescribed gain, to obtain a control deviation. The PI arithmetic unit 240 calculates, in accordance with this control deviation, a d axis voltage command value Vdc and a q axis voltage command value Vqc, each of which is a command value for an applied voltage in each axial direction at the command axial coordinates dc-qc. The d axis voltage command value Vdc is a command value for the d axis. The q axis voltage command value Vqc is a command value for the q axis. The PI arithmetic unit 240 performs feedback control in this manner.

The coordinate transformation unit 250 transforms, by means of a coordinate transformation equation (from two phases to three phases) using the angle θ5 output from the switch unit 350 described later, the d axis voltage command value Vdc and the q axis voltage command value Vqc into voltage command values Vuc, Vvc and Vwc for the respective U phase, V phase and W phase on three-phase AC coordinates as stationary coordinates. The coordinate transformation equation for the coordinate transformation unit 250 is an equation (2), for example.

$$\begin{pmatrix} Vuc \\ Vvc \\ Vwc \end{pmatrix} = \sqrt{\frac{Vdc^2 + Vqc^2}{3}} \begin{pmatrix} \cos\theta_5 \\ \cos\left(\theta_5 - \frac{2}{3}\pi\right) \\ \cos\left(\theta_5 - \frac{4}{3}\pi\right) \end{pmatrix} \tag{2}$$

The PWM unit 260 generates a switching control signal based on a comparison between the voltage command values Vuc, Vvc and Vwc of the respective phases and a prescribed carrier wave, and outputs the switching control signal to the inverter 210. The inverter 210 performs switching control in accordance with the switching control signal. With this switching control, an AC voltage for outputting a torque in accordance with the torque value Tr input to the control unit 310 is applied to the motor 110.

As described above, in the normal control, a closed loop is formed that controls the motor currents to the current command values (Idc and Iqc) corresponding to the torque value Tr. With this closed loop, the output torque from the motor 110 is controlled in accordance with the torque value Tr. In other words, the control unit 310 drives the motor 110 (rotates the rotor 110A) based on the control signal (the current command values (Idc and Iqc) in the present embodiment).

[As to Initial Control]

Figure 3:
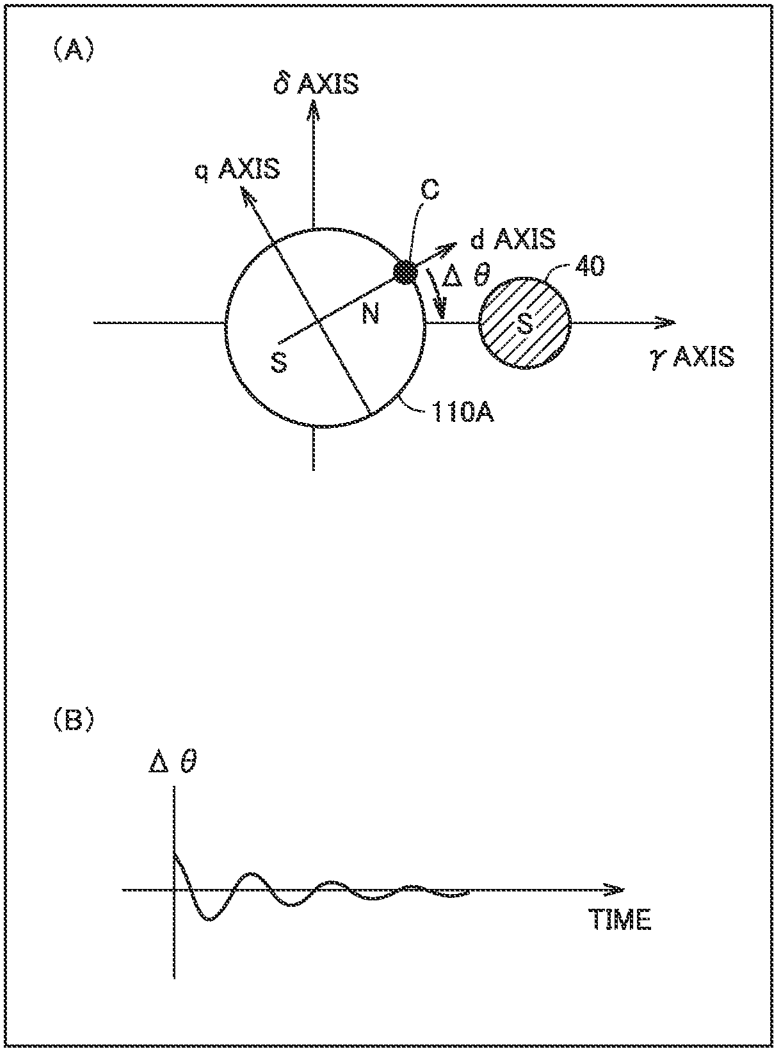
FIG. 3 illustrates initial control.

The initial control is now described. As described above, the initial control is control for causing the rotational position of the motor 110 to match the designated position (initial position). FIG. 3 illustrates the initial control. In the example of FIG. 3(A), a γ axis and a δ axis are shown as plane coordinates. The rotor 110A is illustrated on the plane coordinates. Since the rotor 110A is configured in the form of a two-pole permanent magnet, the motor 110 of the present embodiment is a so-called two-pole motor.

The q axis current is a current corresponding to the torque of the motor 110. Therefore, the control unit 310 sets the q axis current to zero, and sets the d axis current to a prescribed value. As a result, the motor 110 can be prevented from producing a torque, and a magnetic field (S pole magnetic field in the example of FIG. 4) can be generated at a designated position 40. With the generation of such a magnetic field, the control unit 310 rotates the rotor 110A so that an origin C of the rotor 110A is located at the designated position 40 (designated angle) designated by the control unit 310. The origin C is a prescribed position of the rotor 110A.

The designated position 40 is a position corresponding to the angle θ1 (angle θ5). The angle θ1 is also referred to as a designated angle. In other words, the control unit 310 can also change the designated position 40 by changing the angle θ1, after setting the q axis current to zero and setting the d axis current to the prescribed value. In a modification, an N pole magnetic field may be generated at the designated position 40.

In the example of FIG. 3(A), the initial designated position 40 is 0 degree on the γ axis (in other words, the angle θ1=0 degree). FIG. 3(A) shows an angular displacement Δθ. The angular displacement Δθ is an amount of displacement between the designated position 40 and an actual rotational position of the motor 110. The angular displacement Δθ corresponds to "amount of difference" of the present disclosure. As the N pole of the rotor 110A is attracted to the S pole of the designated position 40, Δθ decreases gradually.

FIG. 3(B) shows a relationship between time t elapsed from the time the initial control is started, and the angular displacement Δθ. As shown in FIG. 3(B), the angular displacement Δθ decreases while oscillating with the passage of time t. Then, the initial control preferably ends when the angular displacement Δθ falls within a predetermined reference range. The reference range is a range represented as 0±M, where M is a predetermined margin value. The control unit 310 performs the normal control after the angular displacement Δθ falls within the reference range. Therefore, the motor drive device 400 can perform the normal control while suppressing the angular displacement between the rotational angle of the motor 110 recognized by the motor drive device 400 (the angle estimated by the motor drive device 400) and the actual rotational angle of the motor 110.

Figure 4:
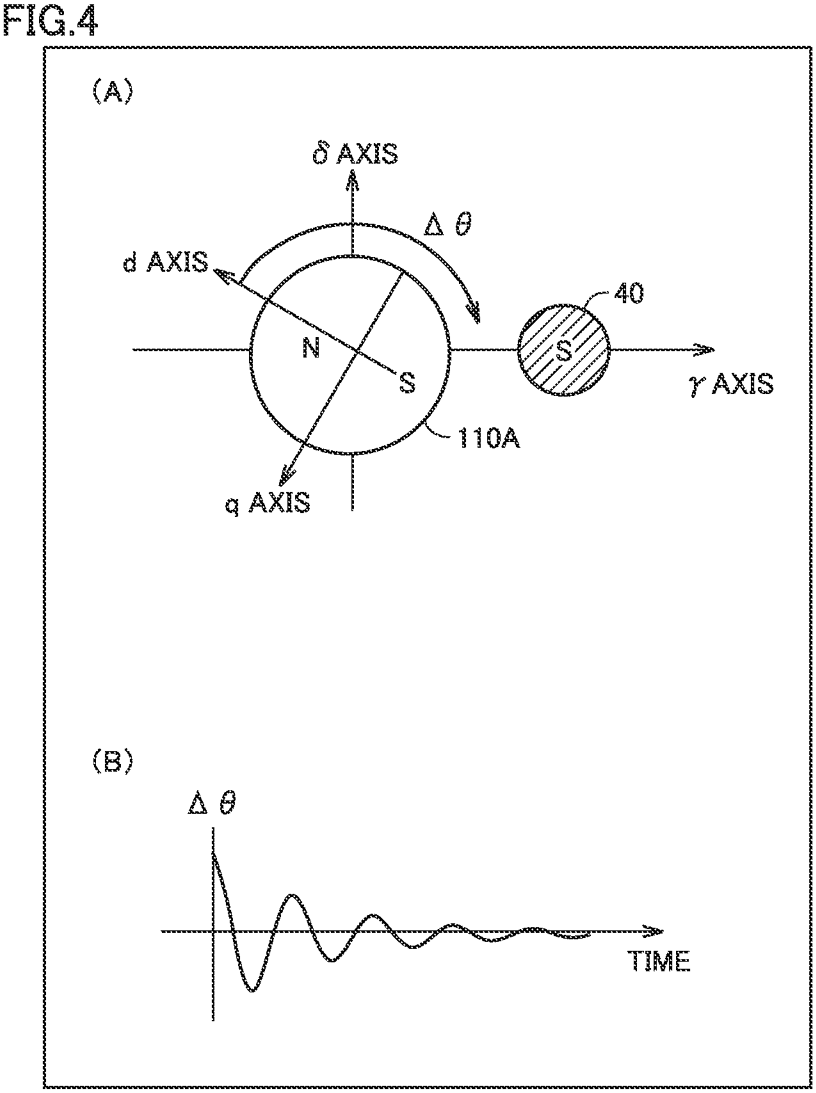
FIG. 4 illustrates initial control.

FIG. 4 shows an example where the angular displacement Δθ is large when the initial control is performed. When the angular displacement Δθ is large as shown in FIG. 4, a significant amount of time is required for the angular displacement Δθ to fall within the reference range from the time the initial control is started. In addition, if the initial control is switched to the normal control before the angular displacement Δθ falls within the reference range, a loss of synchronization or the like may occur in the motor 110.

Therefore, the motor drive device 400 of the present embodiment performs initial control that can reduce the amount of time for the rotational position of the motor 110 to reach the designated position even when the angular displacement Δθ is large. The initial control in the present embodiment is described below in detail.

The description is returned to FIG. 2. As described above, in the initial control, the state of the switch unit 350 is the first state in which the angle θ1 from the addition unit 370 is output to the coordinate transformation unit 320. In the initial control, the control unit 310 outputs an angular speed ωc to the angle arithmetic unit 340, as a command value for an angular speed of the rotor 110A of the angle arithmetic unit 340. As will be described later, the control unit 310 increases the angular speed ωc with the passage of time. In the initial control, the control unit 310 first uses the angle θ1 as an initial angle, to thereby generate an S pole magnetic field at the initial designated position 40. The initial angle is set to 0 degree. Therefore, the control unit 310 can generate a magnetic field at the designated position 40 shown in FIG. 3, for example.

The angle arithmetic unit 340 outputs an angle θ3 by performing a prescribed arithmetic operation. The prescribed arithmetic operation includes, for example, an arithmetic operation of integrating the angular speed ωc. The angle θ3 is output to the addition unit 370.

The correction arithmetic unit 360 calculates a correction value (angle θ2) corresponding to the angular displacement Δθ. As described above, the angular displacement Δθ is the amount of displacement between the designated position 40 and the actual rotational position of the motor 110. The motor drive device 400 does not include a resolver as described above, and thus does not detect the actual rotational position of the motor 110.

Figure 5:
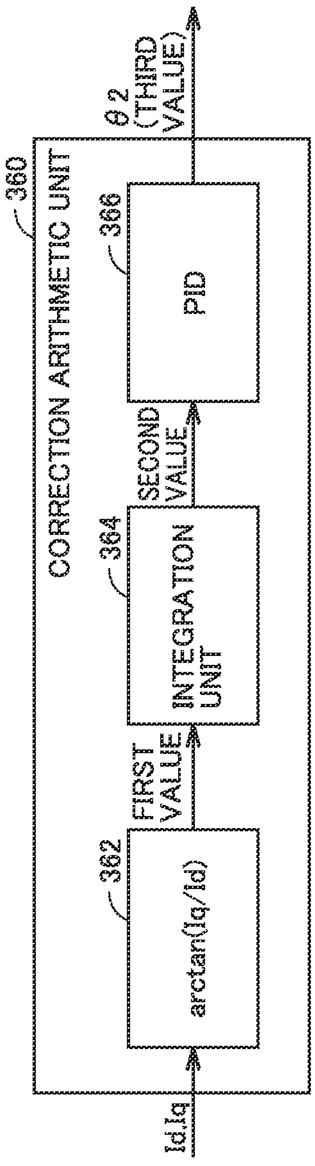
FIG. 5 is a functional block diagram of a correction arithmetic unit.

FIG. 5 is a functional block diagram of the correction arithmetic unit 360. The correction arithmetic unit 360 includes an arc tangent unit 362, an integration unit 364 and a PID unit 366. When the control device 300 generates a magnetic field at the initial designated position 40, the V-phase current Iv is detected by the current sensor 24V, and the W-phase current Iw is detected by the current sensor 24W. These V-phase current Iv and W-phase current Iw are input to the arc tangent unit 362. The arc tangent unit 362 calculates a first value by calculating an arc tangent of a value of the d axis current Id and a value of the q axis current Iq, as shown in the following equation (3):

$$\text{First value} = \arctan(Iq/Id) \tag{3}$$

This first value corresponds to "value based on the d axis current and the q axis current" of the present disclosure. More specifically, the first value is an example of "value based on a phase difference Δp between a phase of the d axis current and a phase of the q axis current." The first value is approximated to the phase difference Δp. This first value is output to the integration unit 364. In a modification, "Id/Iq" may be used instead of "Iq/Id" in the equation (3).

The integration unit 364 calculates a second value by performing integration processing on the first value. This integration processing is time integration. The second value corresponds to "correlation value correlated with the angular displacement Δθ." Stated another way, the second value corresponds to "correlation value correlated with the amount of difference between the positon of the rotor 110A and the designated position 40."

The second value is output to the PID unit 366. The PID unit 366 performs PID (Proportional Integral Derivative) control on the second value. The PID control by the PID unit 366 is an example of "prescribed control" of the present disclosure.

Generally, PID control is performed on a deviation, which is the difference between an actual measured value and a target value. In the present embodiment, the second value corresponds to the actual measured value. The second value is a value based on the angular displacement Δθ, and the present embodiment aims to make the second value equal to zero. In the present embodiment, therefore, zero corresponds to the target value. Thus, the deviation is the difference between the second value and zero, which is the second value itself. Therefore, the second value, which is the deviation, is input to the PID unit 366.

The PID unit 366 calculates a third value by performing PID control on the second value. This third value corresponds to the angle θ2. The third value (angle θ2) calculated by the PID unit 366 is output to the addition unit 370.

The addition unit 370 outputs the angle θ1, which is a total value of the angle θ2 and the angle θ3, to the switch unit 350. The angle θ1 is output as the angle θ5 from the switch unit 350 to the coordinate transformation unit 250 and the coordinate transformation unit 320. The coordinate transformation unit 320 and the coordinate transformation unit 250 perform angle conversion based on the angle θ1, so that the designated position 40 can be changed in the direction of reducing the angular displacement Δθ. Therefore, the motor drive device 400 can reduce the amount of time for the rotational position of the rotor 110A to reach the designated position 40.

[As to Second Value]

Figure 6:
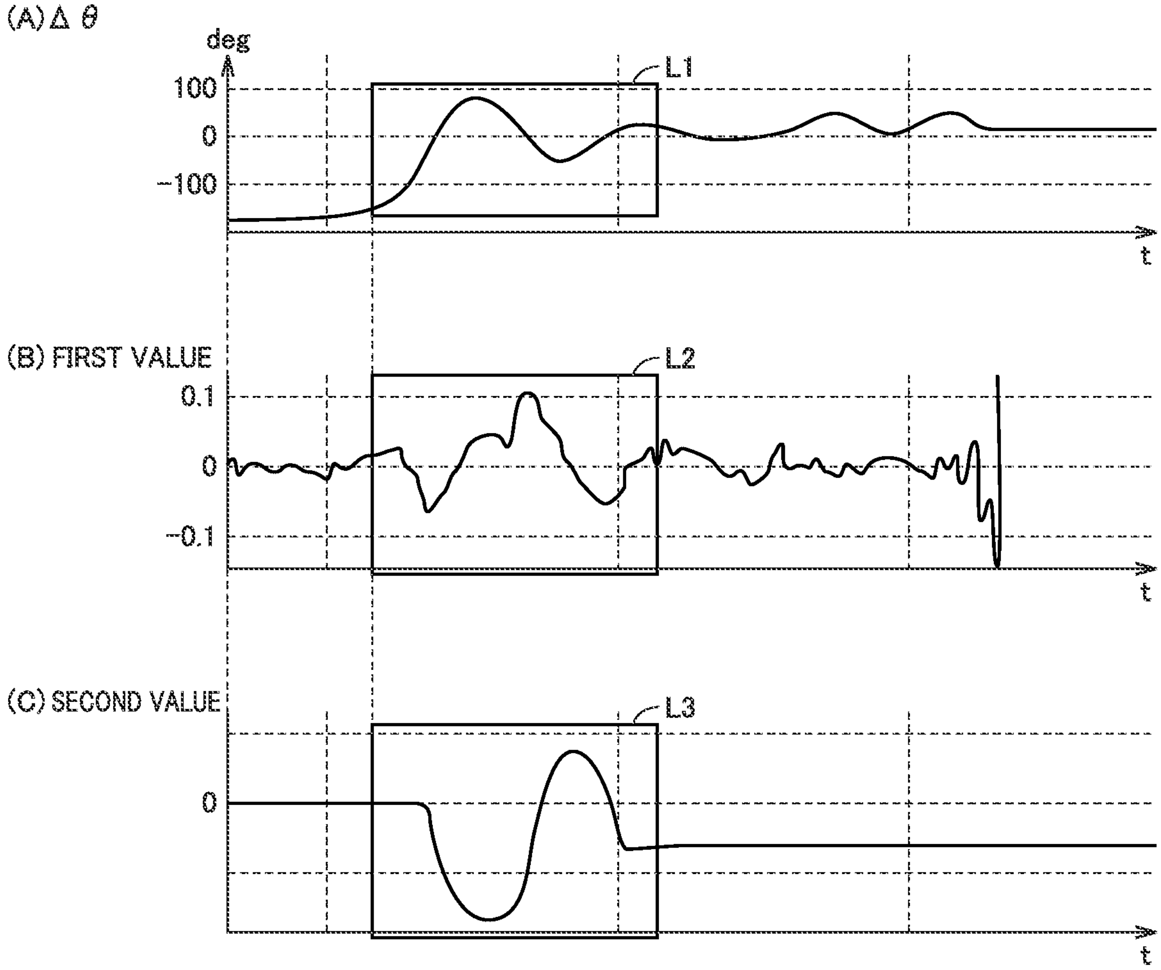
FIG. 6 shows an exemplary result of an experiment.

The reason that the correction arithmetic unit 360 of the present embodiment uses the second value is now described. FIG. 6 shows an exemplary result of an experiment conducted by the inventor. The horizontal axis of FIGS. 6(A) to 6(C) represents time. The vertical axis of FIG. 6(A) represents the angular displacement ΔΘ. The vertical axis of FIG. 6(B) represents the first value. The vertical axis of FIG. 6(C) represents the second value. The angular displacement Δθ in FIG. 6(A) was detected with a resolver by the inventor.

Focused areas in FIGS. 6(A) to 6(C) are marked with a frame L1, a frame L2 and a frame L3, respectively. The inventor detected the angular displacement Δθ, the first value and the second value, and found that there was a correlation between the angular displacement Δθ and the second value.

Particularly, as indicated by the angular displacement Δθ in the frame L1 and the second value in the frame L3, the timings at which the angular displacement Δθ has a local maximum value and a local minimum value roughly match the timings at which the second value has a local minimum value and a local maximum value, respectively. Therefore, the motor drive device 400 of the present embodiment can calculate the second value for reducing the angular displacement Δθ based on the second value.

Figure 7:
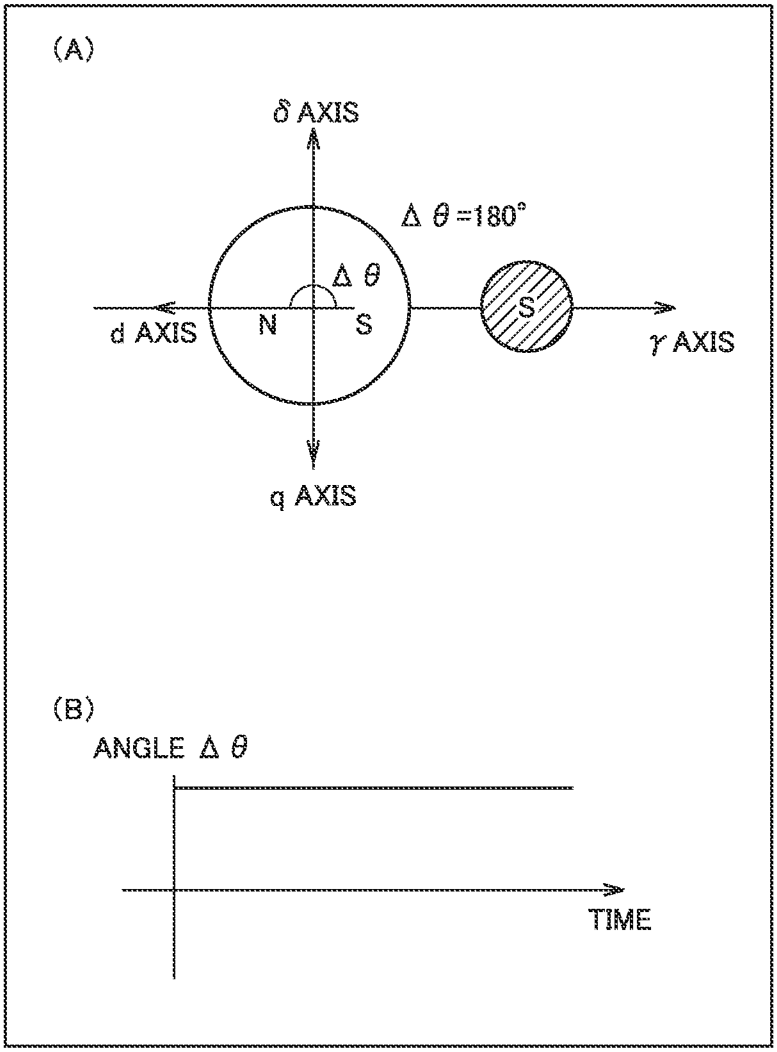
FIG. 7 illustrates initial control.

FIG. 7 illustrates initial control in a situation different from those of FIGS. 3 and 4. FIG. 7(A) shows an example where the origin of the rotor 110A and the initial designated position 40 are 180 degrees apart from each other (in other words, where Δθ is 180 degrees). In this case, the rotor 110A does not rotate even when a magnetic field is generated at the initial designated position 40. Therefore, the angular displacement Δθ does not change (see FIG. 7(B)).

In the present embodiment, therefore, the control unit 310 performs change control of gradually increasing the angular speed ωc in FIG. 2 (in other words, the angle θ3) with the passage of time. With this change control, the designated position 40 can be changed, and the angular displacement Δθ can be an angle different from 180 degrees. As a result, the N pole of the rotor 110A can be attracted to the changed designated position 40 (S pole). Therefore, even when the angular displacement Δθ is 180 degrees, the rotor 110A can be rotated through this change control performed by the control unit 310. Thus, the motor drive device 400 can allow the origin of the rotor 110A to be located at the designated position 40.

[As to PID Control]

As described above, the PID unit 366 performs the PID control. The second value can be more appropriately brought closer to zero through the PID control performed by the PID unit 366.

Generally, however, noise on the phase of the d axis current and the phase of the q axis current may be included in a signal of interest on which D control is performed. In this case, a derivative term by the D control often deteriorates robustness of the control device 300. To avoid this robustness deterioration, PI control may be performed without the D control. Such PI control, however, may not be able to appropriately bring the second value closer to zero.

FIG. 8 illustrates how the D control deteriorates the robustness. An equation (A) of FIG. 8 is a differential equation by the D control when the signal of interest on which the D control is performed does not include noise. In the equation (A) of FIG. 8, "x(t)" represents the signal of interest on which the D control is performed, and "T" represents a sampling period (control period) of the control device 300 (PID unit 366).

Depending on the performance of the CPU 302 (see FIG. 1) of the motor drive device 400, the PID control may be performed both with a first sampling period and with a second sampling period. The first sampling period is a design period T of the control device 300. The second sampling period is a period in which an error Te is added to the design period T. Such existence of both the first sampling period and the second sampling period is referred to as "period variation."

An equation (B) of FIG. 8 is a differential equation by the D control when an error signal Err(t) is added to the signal of interest, and when the period variation occurs. An equation (C) is an equation in which the equation (B) has been developed.

As shown in a portion D1 of the equation (C), the signal after differentiation includes the period variation. Further, as shown in a portion D2, the signal after differentiation includes two-round noise signals of xe(t) and xe(t−T), resulting in the robustness deterioration as described above.

In contrast, the signal of interest for the PID control performed by the PID unit 366 of the present embodiment corresponds to the second value, which is calculated by the integration processing on the first value by the integration unit 364. Generally, even if a signal includes the noise, the noise is suppressed through integration processing. Therefore, the PID unit 366 can perform the PID control on the signal with the suppressed noise, thereby suppressing the robustness deterioration and appropriately bringing the second value closer to zero.

[Flowchart]

Figure 9:
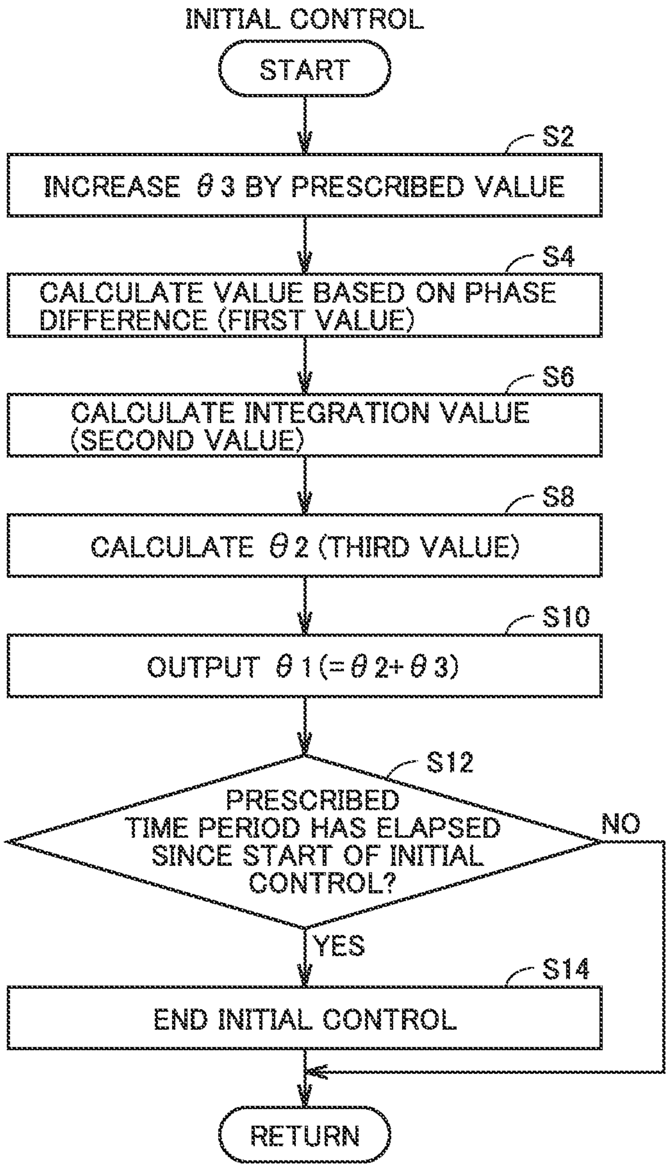
FIG. 9 is a flowchart showing a process of the initial control of a motor drive device 400.

FIG. 9 is a flowchart showing a process of the initial control of the motor drive device 400. FIG. 9 is started when the motor drive device 400 receives the start signal C. The motor drive device 400 performs the process of FIG. 9 for each sampling period T. In other words, the process of FIG. 9 is repeated from the time the motor drive device 400 receives the start signal C, to the time a termination condition indicated in step S12 described later is satisfied.

First, in step S2, the motor drive device 400 increases the angle θ3 by a prescribed value. This process of step S2 corresponds to the change control described above. Next, in step S4, the motor drive device 400 calculates, based on the equation (3), a value based on the phase difference Δp (first value).

Next, in step S6, the motor drive device 400 calculates the second value by time-integrating the first value. This time integration is time integration in the sampling period described above. Step S6 is also a process of calculating a total value of the second values from the time the start signal C was received. In other words, in step S6, the motor drive device 400 adds a currently calculated second value to a total value of the second values calculated in previous step S6.

Next, in step S8, the motor drive device 400 calculates θ2 (third value) by performing PID control on the second value calculated in step S6. Next, in step S10, the motor drive device 400 outputs the angle θ1 (θ2+θ3) to the coordinate transformation unit 250 and the coordinate transformation unit 320. Next, in step S12, the motor drive device 400 determines whether or not a prescribed time period has elapsed since the start of the initial control. The prescribed time period is 200 ms, for example. When the determination is YES in step S12, the initial control ends (the initial control flag is erased), and the process of FIG. 9 ends.

When the determination is NO in step S12, on the other hand, the process of FIG. 9 ends while the initial control flag remains. In other words, when the determination is NO in step S12, the initial control for the next sampling period is performed.

[Simulation Results]

Figure 10:
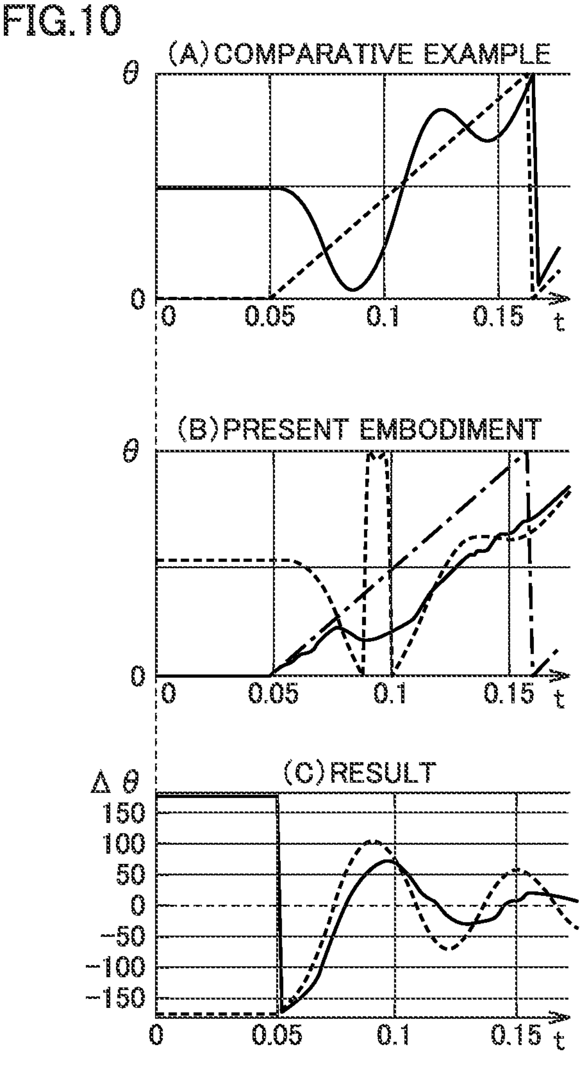
FIG. 10 shows simulation results.

FIG. 10 shows simulation results of the motor drive device 400 of the present embodiment. The motor drive device 400 of the present embodiment is compared to a motor drive device of a comparative example. The motor drive device of the comparative example is a device that performs the change control described above, but does not include the correction arithmetic unit 360. In these simulations, the motor drive device 400 of the present embodiment and the motor drive device of the comparative example were each provided with a resolver in order to detect the actual angle of the rotor 110A.

The horizontal axis of FIGS. 10(A) to 10(C) represents time. The vertical axis of FIGS. 10(A) and 10(B) represents an electrical angle, and the vertical axis of FIG. 10(C) represents the angular displacement Δθ.

FIG. 10(A) shows a simulation result of the motor drive device of the comparative example. In FIG. 10(A), the angle θ1 (=θ3) is indicated by a broken line, and the actual rotational angle of the rotor 110A of the comparative example is indicated by a solid line. As illustrated in FIG. 10(A), the angle θ3 is shown to approach the actual angle to some degree in the motor drive device of the comparative example.

FIG. 10(B) shows a simulation result of the motor drive device 400 of the present embodiment. In FIG. 10(B), the angle θ1 (=θ2+θ3) is indicated by a solid line, and the actual rotational angle of the rotor 110A is indicated by a broken line. In addition, the angle θ3 is indicated by a chain-dotted line. As illustrated in FIG. 10(B), the angle θ1 is shown to approach the actual angle in the motor drive device 400 of the present embodiment.

FIG. 10(C) shows a result of comparison between the motor drive device of the comparative example and the motor drive device 400 of the present embodiment. The angular displacement Δθ in the motor drive device 400 of the present embodiment is indicated by a solid line, and the angular displacement Δθ in the motor drive device of the comparative example is indicated by a broken line. As shown in FIG. 10(C), the angular displacement Δθ decreases more quickly in the motor drive device 400 of the present embodiment than in the motor drive device of the comparative example. In other words, the amount of time for the rotational position of the rotor 110A to reach the designated position from the start of the initial control is shorter in the motor drive device 400 of the present embodiment than in the motor drive device of the comparative example.

[Functions and Effects of Motor Drive Device of Present Embodiment]

As described above in FIGS. 5, 6 and the like, the motor drive device 400 of the present embodiment calculates the correlation value (second value) by integrating the value based on the d axis current and the q axis current (first value). The motor drive device 400 then performs, based on the correlation value, the initial control for causing the rotational position of the rotor 110A to match the designated position 40. Specifically, the motor drive device 400 performs the initial control using the command value based on the correlation value. In this manner, the motor drive device 400 performs the initial control using the correlation value correlated with the angular displacement Δθ, thereby allowing for a decrease in the amount of time for the rotational position of the rotor 110A to reach the designated position.

One method for improving the accuracy of estimating the rotational position of a rotor in a sensorless configuration employs superimposition of harmonic signals. In an SPM (surface permanent magnetic) motor, however, the superimposition of harmonic signals cannot be employed. In the motor drive device 400 of the present embodiment, the initial control can be performed without employing the superimposition of harmonic signals.

Further, the motor drive device 400 performs the position control by performing the prescribed control for making the second value equal to zero. Therefore, the motor drive device 400 can make the amount of difference equal to zero by the prescribed control.

Further, the prescribed control is PID control on the correlation value (see FIG. 5). Therefore, the motor drive device 400 can calculate the third value by relatively simple control.

Further, the motor drive device 400 calculates the arc tangent value of the value of the d axis current and the value of the q axis current as the first value (see FIG. 5). Therefore, the motor drive device 400 can calculate the first value by relatively simple control.

Further, the motor drive device 400 ends the initial control when the prescribed time period elapses from the start of the initial control, as shown in step S12. Therefore, the motor drive device 400 can determine whether or not to end the initial control by relatively simple control.

Further, the motor drive device 400 performs the change control of gradually changing the designated position 40 with the passage of time (step S2 in FIG. 9). Therefore, the motor drive device 400 can appropriately perform the initial control even when the value of Δθ is 180 degrees as shown in FIG. 7.

Further, the rotor 110A is configured in the form of a two-pole magnet, as shown in FIG. 3. Therefore, while the configuration of the rotor 110A can be simplified, the angular displacement Δθ tends to occur. According to the motor drive device 400 of the present embodiment, however, the initial control can be appropriately performed even when the rotor 110A, which is a two-pole magnet that causes an increase in the angular displacement Δθ, is employed.

Other Embodiments (1) According to the embodiment described above, the motor drive device 400 calculates the arc tangent value of the value of the d axis current and the value of the q axis current as the first value (the value based on the phase difference Δp between the phase of the d axis current and the phase of the q axis current), as described in FIG. 5. However, the first value may be calculated by other methods.

Figure 11:
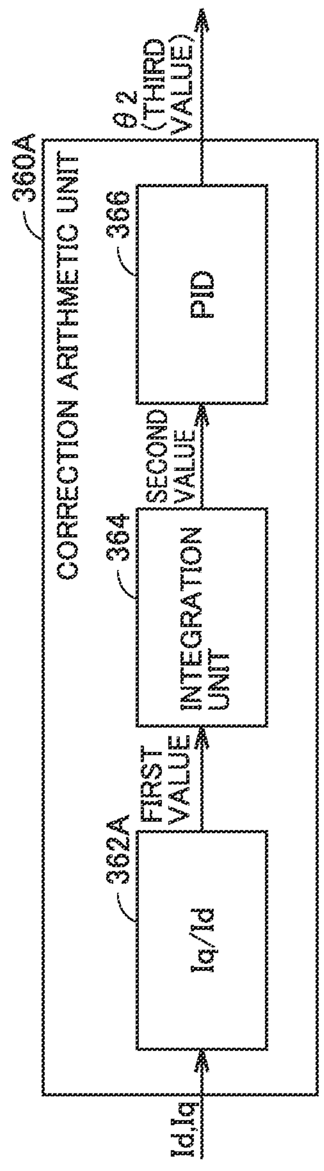
FIG. 11 is a functional block diagram of the correction arithmetic unit in a modification.

FIG. 11 is a functional block diagram of a correction arithmetic unit 360A of the motor drive device 400 in the present modification. The correction arithmetic unit 360A in FIG. 11 corresponds to the correction arithmetic unit 360 in FIG. 5, except that the arc tangent unit 362 has been replaced by a division unit 362A. The division unit 362A calculates the first value by calculating a division value of the value of the d axis current and the value of the q axis current, as shown in the following equation (4):

$$\text{First value} = Iq/Id \tag{4}$$

Even with such a configuration, the motor drive device 400 can calculate the first value without performing a complicated arithmetic operation, such as an arithmetic operation of a trigonometric function used to calculate the phase. In a modification, Id/Iq may be used instead in the right side of the equation (4).

Figure 12:
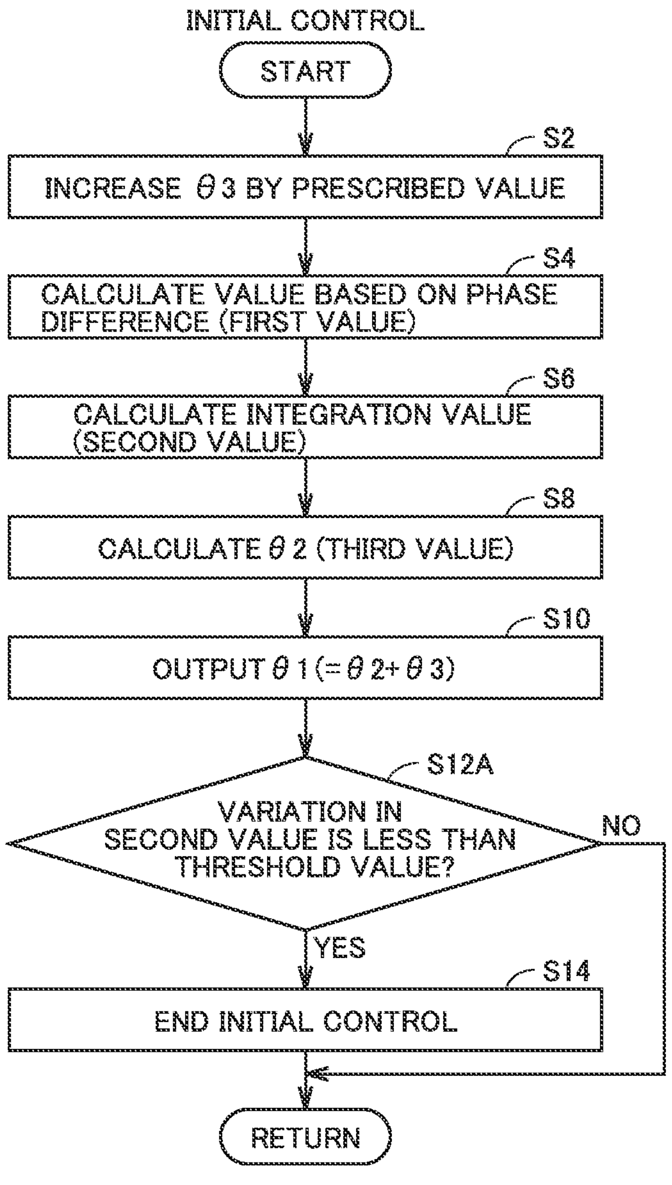
FIG. 12 is a flowchart showing a process of the motor drive device in the modification.

(2) The termination condition for the initial control in the embodiment described above is the lapse of the prescribed time period since the start of the initial control (see S12 of FIG. 9). However, any other termination condition may be employed. FIG. 12 is a flowchart showing a process of the motor drive device 400 in the present modification.

The flowchart of FIG. 12 corresponds to the flowchart of FIG. 9, except that step S12 has been replaced by step S12A. A termination condition in step S12A is a condition that a variation in the second value is less than a threshold value. In the following description, control performed by the control device 300 in a single sampling period is also referred to as "period control." The variation is a difference value between the second value calculated in the previous period control, and the second value calculated in the current period control.

As shown in FIGS. 6(A) and 6(C), the decrease in the angular displacement Δθ is correlated with the variation in the second value. The present modification is based on this correlation. Even with such a configuration, the motor drive device 400 can determine whether or not to end the position control with a relatively simple configuration.

(3) The configuration of the motor drive device 400 described above does not include a resolver. However, the motor drive device 400 may include a resolver. For example, even if the motor drive device 400 includes a resolver before shipment of the motor drive device 400, the angular displacement Δθ may still occur. Even in such a case, the angular displacement Δθ can be made equal to zero by the position control of the motor drive device 400.

Additional Aspects (1) A motor drive device of the present disclosure includes a motor, an inverter, and a control device. The motor includes a rotor, and a stator around which coils of three phases are wound. The inverter drives the motor. The control device controls the inverter. The control device performs coordinate transformation of a current flowing through the motor into a d axis current and a q axis current. The control device calculates a correlation value by integrating a value based on the d axis current and the q axis current, the correlation value correlated with an amount of difference between a position of the rotor and a designated position. The control device performs, based on the correlation value, position control for causing the position of the rotor to match the designated position.

According to such a configuration, the motor drive device performs the position control based on the correlation value correlated with the amount of difference between the position of the rotor and the designated position. Therefore, the motor drive device can reduce the amount of time for the position of the rotor to reach the designated position.

(2) In the motor drive device according to (1), the control device performs the position control by performing prescribed control for making the correlation value equal to zero.

According to such a configuration, the amount of difference can be made equal to zero by the prescribed control.

(3) In the motor drive device according to (1) or (2), the prescribed control is PID control on the correlation value.

According to such a configuration, the amount of difference can be made equal to zero by a relatively simple arithmetic operation.

(4) In the motor drive device according to any one of (1) to (3), the value based on the d axis current and the q axis current is an arc tangent value of a value of the d axis current and a value of the q axis current.

According to such a configuration, the value based on the d axis current and the q axis can be calculated with a relatively simple configuration.

(5) In the motor drive device according to any one of (1) to (3), the value based on the d axis current and the q axis current is a division value, the division value being determined by division of a value of the d axis current by a value of the q axis current, or division of the value of the q axis current by the value of the d axis current.

According to such a configuration, the value based on the d axis current and the q axis current can be calculated without performing a complicated arithmetic operation, such as an arithmetic operation of a trigonometric function.

(6) In the motor drive device according to any one of (1) to (5), the control device changes the designated position with passage of time.

According to such a configuration, the amount of time for the position of the rotor to reach the designated position can be reduced even when the amount of difference is 180 degrees.

(7) In the motor drive device according to any one of (1) to (6), the control device ends the position control when a prescribed time period elapses from a start of the position control.

According to such a configuration, it can be determined whether or not to end the position control with a relatively simple configuration.

(8) In the motor drive device according to any one of (1) to (6), the control device ends the position control when a variation in the correlation value is less than a threshold value.

According to such a configuration, it can be determined whether or not to end the position control with a relatively simple configuration.

(9) In the motor drive device according to any one of (1) to (8), the rotor includes a two-pole magnet.

According to such a configuration, while the configuration of the rotor can be simplified because the rotor includes a two-pole magnet, the amount of difference tends to increase. However, the amount of difference can be suppressed by the motor drive device of the present disclosure.

Although the embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. A motor drive device comprising:

a motor including a rotor, and a stator around which coils of three phases are wound;

an inverter that drives the motor; and a control device that controls the inverter, wherein the control device performs a normal control for producing torque in the motor and an initial control prior to the normal control, and the control device during the initial control performs coordinate transformation of a current flowing through the motor into a d axis current and a q axis current, calculates a correlation value by integrating a value based on the d axis current and the q axis current, the correlation value correlated with an amount of difference between a position of the rotor and a designated position, performs, based on the correlation value, position control for causing an initial position of the rotor to match the designated position, performs the position control by generating a magnetic field at the designated position with the q-axis current command value set to zero and the d-axis current command value set to a predetermined value, and changes the designated position with passage of time such that the amount of difference decreases.

2. The motor drive device according to claim 1, wherein the control device performs the position control by performing prescribed control for making the correlation value equal to zero.

3. The motor drive device according to claim 2, wherein the prescribed control is PID control on the correlation value.

4. The motor drive device according to claim 1, wherein the value based on the d axis current and the q axis current is an arc tangent value of a value of the d axis current and a value of the q axis current.

5. The motor drive device according to claim 1, wherein the value based on the d axis current and the q axis current is a division value, the division value being determined by division of a value of the d axis current by a value of the q axis current, or division of the value of the q axis current by the value of the d axis current.

6. The motor drive device according to claim 1, wherein the control device ends the position control when a prescribed time period elapses from a start of the position control.

7. The motor drive device according to claim 1, wherein the control device ends the position control when a variation in the correlation value is less than a threshold value.

8. The motor drive device according to claim 1, wherein the rotor includes a two-pole magnet.

9. The motor drive device according to claim 1, wherein the control device changes the designated position by performing change control of gradually increasing a command value for an angular speed of the rotor with passage of time.

* * * * *